(12) United States Patent
Nam et al.

(10) Patent No.: US 12,488,160 B2
(45) Date of Patent: Dec. 2, 2025

(54) HOLOGRAPHIC DISPLAY SIMULATION DEVICE AND METHOD

(71) Applicant: ELECTRONICS AND TELECOMMUNICATIONS RESEARCH INSTITUTE, Daejeon (KR)

(72) Inventors: Jeho Nam, Daejeon (KR); Min-Sik Park, Daejeon (KR); Seung Hyup Shin, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 1031 days.

(21) Appl. No.: 17/543,480

(22) Filed: Dec. 6, 2021

(65) Prior Publication Data
US 2022/0229953 A1    Jul. 21, 2022

(30) Foreign Application Priority Data

Jan. 20, 2021 (KR) .................. 10-2021-0008124

(51) Int. Cl.
  *G06F 7/48*    (2006.01)
  *G06F 30/20*   (2020.01)
(52) U.S. Cl.
  CPC .................................. *G06F 30/20* (2020.01)
(58) Field of Classification Search
  CPC ........ A61B 2034/102; A61B 2034/105; A61B 2034/2065; A61B 2090/365; A61B 2090/367; A61B 2090/376; A61B 2090/378; A61B 34/10; A61B 34/30; A61B 90/36; A61B 90/37; A61D 1/00;
  (Continued)

(56) References Cited

U.S. PATENT DOCUMENTS

| 9,158,279 B2 | 10/2015 | Lee et al. |
| 2014/0085692 A1 | 3/2014 | Lee et al. |

(Continued)

FOREIGN PATENT DOCUMENTS

| KR | 10-1496802 B1 | 3/2015 |
| KR | 10-2016-0142626 A | 12/2016 |

(Continued)

OTHER PUBLICATIONS

Lee, Seungjae, et al. "Light source optimization for partially coherent holographic displays with consideration of speckle contrast, resolution, and depth of field." Scientific reports 10.1 (2020): 18832. (Year: 2020).*

(Continued)

*Primary Examiner* — Nithya J. Moll

(57) ABSTRACT

A holographic display simulation device and a holographic display simulation method are provided. A holographic display simulation device includes a processor; and a memory including one or more instructions, wherein the one or more instructions are executed by the processor, and a holographic display is simulated by using at least one of a light source part model, a spatial light modulator model, and a display optical system model that respectively model a light source part, a spatial light modulator, and a display optical system of the holographic display.

16 Claims, 13 Drawing Sheets

(58) Field of Classification Search
CPC .............. G03H 1/0808; G03H 1/2294; G03H 2001/221; G03H 2001/2236; G03H 2222/20; G03H 2226/02; G03H 2226/04; G03H 2240/56; G03H 2240/61; G03H 2240/62; G06F 3/011; G06F 30/20; G06T 19/20; G06T 2207/20016; G06T 2210/41; G06T 2219/024; G06T 2219/2004; G06T 7/344; G16H 20/40; G16H 30/40; G16H 40/67

See application file for complete search history.

(56) References Cited

U.S. PATENT DOCUMENTS

| | | |
|---|---|---|
| 2016/0187850 A1 | 6/2016 | Oh |
| 2020/0249754 A1 | 8/2020 | Morozov et al. |
| 2020/0296327 A1* | 9/2020 | Karafin ................ G03H 1/2294 |
| 2020/0371472 A1* | 11/2020 | Karafin ............. G06Q 30/0643 |
| 2021/0018986 A1* | 1/2021 | O'Brien .................. G06F 3/017 |
| 2021/0073436 A1* | 3/2021 | Duff .................. G02B 27/0093 |

FOREIGN PATENT DOCUMENTS

| | | |
|---|---|---|
| KR | 10-1942972 B1 | 1/2019 |
| KR | 10-1983909 B1 | 5/2019 |
| KR | 10-2020-0096716 A | 8/2020 |
| WO | 2008/138981 A2 | 11/2008 |

OTHER PUBLICATIONS

"Data Format for OPENHOLO-based Holographic Display Model", Telecommunication Technology Association, Dec. 10, 2020.

* cited by examiner

FIG. 3

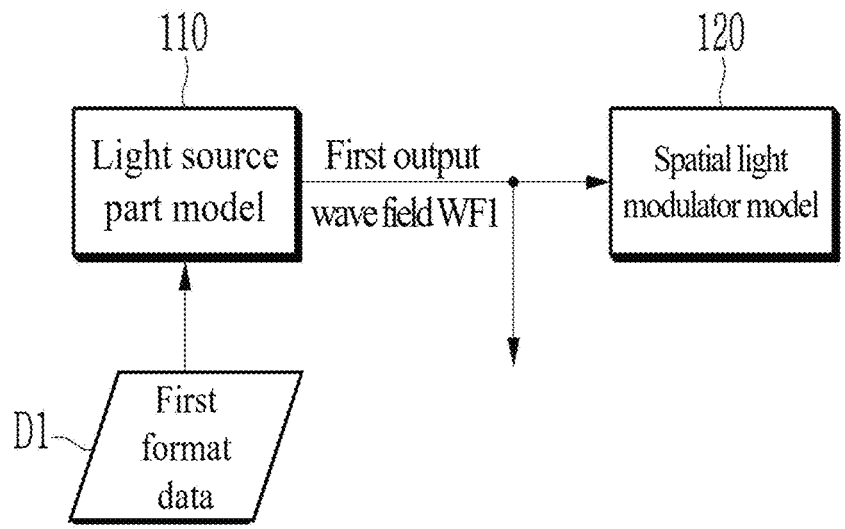

```
<complexType name="PartialCoherenceType">
<sequence>
<element name="Hologram" type="ophd:HologramType"/>
<element name="TemporalCoherence" type="ophd:TemporalCoherenceType"/>
</sequence>
</complexType>
<complexType name="TemporalCoherenceType">
<sequence>
        <element name="NumberOfComponents" type="integer"/>
        <element name="FWHM" type="float"/>
        <element name="DelayDistance" type="float"/>
</sequence>
</complexType>
```

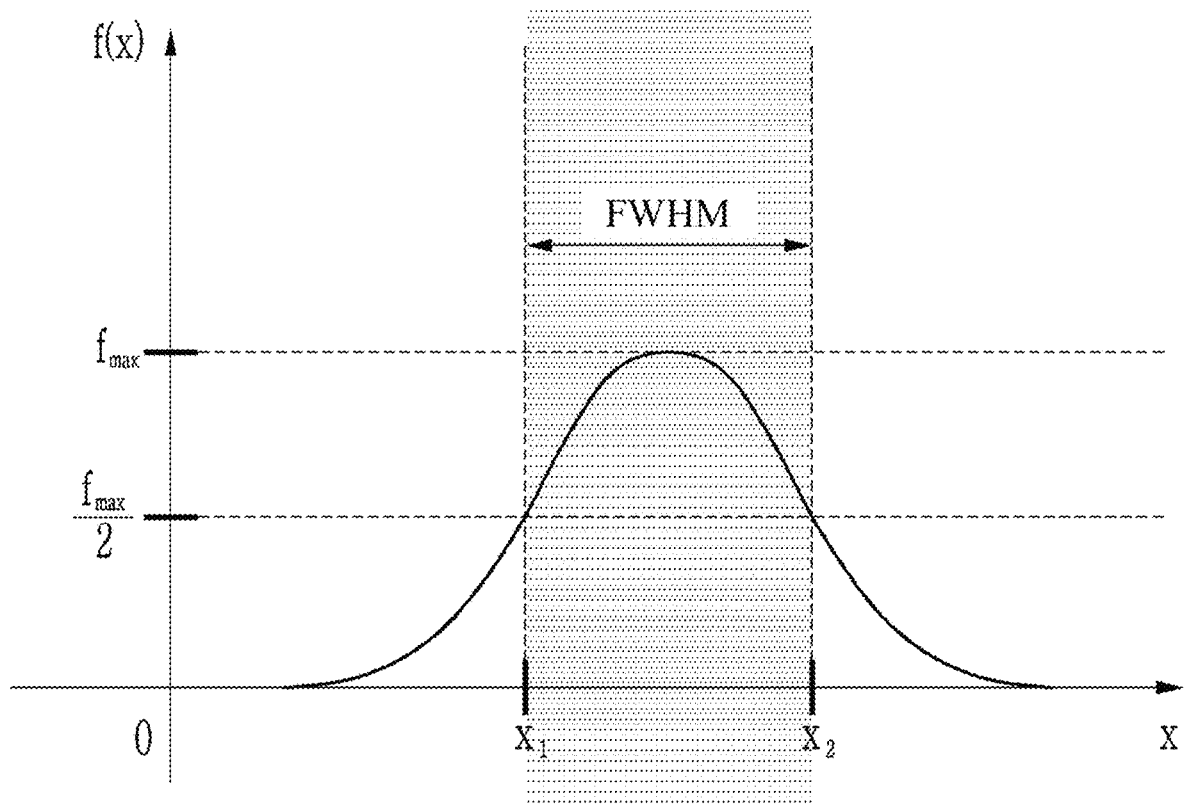

FIG. 8

```
<complexType name="WavefrontAberrationType" abstract="true">
    <sequence>
        <element name="Wavelength" type="float"/>
        <element name="PixelPitchHor" type="float"/>
        <element name="PixelPitchVer" type="float"/>
        <element name="ResolutionHor" type="integer"/>
        <element name="ResolutionVer" type="integer"/>
        <element name="ZernikeCoeff">
            <complexType>
                <attribute name="z44" type="integer" use="optional"/>
                <attribute name="z43" type="integer" use="optional"/>
                <attribute name="z42" type="integer" use="optional"/>
                <attribute name="z41" type="integer" use="optional"/>
                <attribute name="z40" type="integer" use="optional"/>
                <attribute name="z39" type="integer" use="optional"/>
                <attribute name="z38" type="integer" use="optional"/>
                <attribute name="z37" type="integer" use="optional"/>
                <attribute name="z36" type="integer" use="optional"/>
                <attribute name="z35" type="integer" use="optional"/>
                <attribute name="z34" type="integer" use="optional"/>
                <attribute name="z33" type="integer" use="optional"/>
                <attribute name="z32" type="integer" use="optional"/>
                <attribute name="z31" type="integer" use="optional"/>
                <attribute name="z30" type="integer" use="optional"/>
                <attribute name="z29" type="integer" use="optional"/>
                <attribute name="z28" type="integer" use="optional"/>
                <attribute name="z27" type="integer" use="optional"/>
                <attribute name="z26" type="integer" use="optional"/>
                <attribute name="z25" type="integer" use="optional"/>
```

FIG. 9

```
<attribute name="z24" type="integer" use="optional"/>
<attribute name="z23" type="integer" use="optional"/>
<attribute name="z22" type="integer" use="optional"/>
<attribute name="z21" type="integer" use="optional"/>
<attribute name="z20" type="integer" use="optional"/>
<attribute name="z19" type="integer" use="optional"/>
<attribute name="z18" type="integer" use="optional"/>
<attribute name="z17" type="integer" use="optional"/>
<attribute name="z16" type="integer" use="optional"/>
<attribute name="z15" type="integer" use="optional"/>
<attribute name="z14" type="integer" use="optional"/>
<attribute name="z13" type="integer" use="optional"/>
<attribute name="z12" type="integer" use="optional"/>
<attribute name="z11" type="integer" use="optional"/>
<attribute name="z10" type="integer" use="optional"/>
<attribute name="z09" type="integer" use="optional"/>
<attribute name="z08" type="integer" use="optional"/>
<attribute name="z07" type="integer" use="optional"/>
<attribute name="z06" type="integer" use="optional"/>
<attribute name="z05" type="integer" use="optional"/>
<attribute name="z04" type="integer" use="optional"/>
<attribute name="z03" type="integer" use="optional"/>
<attribute name="z02" type="integer" use="optional"/>
<attribute name="z01" type="integer" use="optional"/>
<attribute name="z00" type="integer" use="optional"/>
</complexType>
</element>
</sequence>
</complexType>
```

FIG. 11

```
<complexType name="CascadedPropagationType">
    <sequence>
        <element name="NumColors" type="integer"/>
        <element name="WavelengthR" type="float"/>
        <element name="WavelengthG" type="float"/>
        <element name="WavelengthB" type="float"/>
        <element name="PixelPitchHor" type="float"/>
        <element name="PixelPitchVer" type="float"/>
        <element name="ResolutionHor" type="float"/>
        <element name="ResolutionVer" type="float"/>
        <element name="FieldLensFocallength" type="float"/>
        <element name="DistReconstructionPlaneToPupil" type="float"/>
        <element name="DistPupilToRetina" type="float"/>
        <element name="PupilDiameter" type="float"/>
        <element name="HologramPath" type="anyURI"/>
    </sequence>
</complexType>
```

HOLOGRAPHIC DISPLAY SIMULATION DEVICE AND METHOD

CROSS-REFERENCE TO RELATED APPLICATION

This application claims priority to and the benefit of Korean Patent Application No. 10-2021-0008124 filed in the Korean Intellectual Property Office on Jan. 20, 2021, the entire contents of which are incorporated herein by reference.

BACKGROUND OF THE DISCLOSURE

(a) Field of the Disclosure

The present disclosure relates to a holographic display simulation device and a holographic display simulation method.

(b) Description of the Related Art

A holography technique is an ultimate three-dimensional (3D) stereoscopic image reconstruction technique that can fundamentally solve limitations of representation of a stereoscopic image caused by an existing stereo method, by reconstructing a 3D object in space and providing a natural 3D effect to a viewer. Particularly, a digital holography technique may generate a computer-generated hologram (CGH) for 3D information related to a 3D object and a real image based on a principle of optical diffraction and interference by using a photo-electronic device and a computer, and then may reconstruct a stereoscopic image as if it exists in space by an optical display method.

A holographic display technique that reconstructs a 3D hologram image in space uses light diffraction, and in order to implement it, performance of a spatial light modulator (SLM) is important. Among physical components of the SLM, a pixel pitch is a factor that determines a viewing angle at which a holographic image may be observed. Due to a pixel size pitch of a currently commercialized SLM, it has a device limitation in which it is difficult to reconstruct a large hologram with high resolution. Meanwhile, a holographic display uses a coherent light source capable of wavefront interference of light waves to reconstruct a three-dimensional image in space.

In order to develop signal processing and signal generation techniques for each display required for various holographic displays, development of data interface library modules for the holographic displays and a test code for each module are required. In addition, a simulation based on an optical structure and characteristics of the holographic display is required for analysis and measurement of a wave field outputted by the holographic display operating according to an optical principle and characteristics. However, when the software library modules implemented for the simulation are implemented in different ways, such as different structures and programming languages, compatibility may deteriorate. In order to improve this, a standardized data interface that provides interoperability between different holographic displays through a definition of a common holographic display model in various optical characteristics and display structures is required.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present disclosure has been made in an effort to provide a holographic display simulation device and a holographic display simulation method that may provide a standardized data interface with interoperability in various holographic display structures.

An embodiment of the present disclosure provides a holographic display simulation device, including: a processor; and a memory including one or more instructions, wherein the one or more instructions are executed by the processor, and a holographic display is simulated by using at least one of a light source part model, a spatial light modulator model, and a display optical system model that respectively model a light source part, a spatial light modulator, and a display optical system of the holographic display.

The processor may input first format data to the light source part model to obtain a first output wave field as a result of partial coherence simulation for the light source part.

In the first format data, temporal partial coherence type information may be included as an XML schema to define the light source part model.

In the first format data, spatial partial coherence type information may be included as an XML schema to define the light source part model.

The first output wave field may be provided to the spatial light modulator model.

The processor may input second format data to the spatial light modulator model to obtain a second output wave field as a result of simulation for the spatial light modulator.

In the second format data, holographic data type information may be included as an XML schema to define the spatial light modulator model.

The second output wave field may be provided to the display optical system model.

The display optical system model may include a wavefront aberration model and a cascaded propagation model, and the processor may input third format data to the wavefront aberration model to obtain a third output wave field as a result of simulation for a wavefront aberration of the holographic display.

In the third format data, wavefront aberration type information may be included as an XML schema to define the wavefront aberration model.

The third output wave field may be provided to the cascaded propagation model.

The processor may input fourth format data to the cascaded propagation model to obtain a fourth output wave field as a result of simulation for cascaded propagation of the holographic display.

In the fourth format data, cascaded propagation type information may be included as an XML schema to define the cascaded propagation model.

The holographic display simulation device may further include a storage storing a model library including at least one of the light source part model, the spatial light modulator model, and the display optical system model.

Another embodiment of the present disclosure provides a holographic display simulation method, including: being provided with at least one of a light source part model, a spatial light modulator model, and a display optical system model that respectively model a light source part, a spatial light modulator, and a display optical system of a holographic display; simulating the holographic display by using at least one of the light source part model, the spatial light modulator model, and the display optical system model; and obtaining a wave field as a result of the simulating.

The simulating may include inputting first format data to the light source part model and performing a partial coherence simulation for the light source part.

The simulating may include inputting second format data to the spatial light modulator model and performing a simulation for the spatial light modulator.

The display optical system model may include a wavefront aberration model and a cascaded propagation model, and the simulating may include inputting third format data to the wavefront aberration model and performing a simulation for a wavefront aberration of the holographic display.

The simulating may include inputting fourth format data to the cascaded propagation model and performing a simulation for cascaded propagation of the holographic display.

The holographic display simulation method may further include accessing a model library including at least one of the light source part model, the spatial light modulator model, and the display optical system model from a storage device.

According to the embodiments of the present disclosure, they are provided as a separate data format through a standardized data interface that provides variables and parameters defining a least one of a light source part model respectively modeling a light source part, a spatial light modulator, and a display optical system of a holographic display; a spatial light modulator model; and a display optical system model, so that it is possible to provide interoperability for holographic displays having various structures or implemented in various ways.

BRIEF DESCRIPTION OF THE DRAWINGS

FIG. 3 to FIG. 5 are drawings for explaining a simulation of a holographic display by using a light source part model according to an embodiment of the present disclosure.

FIG. 7 to FIG. 12 are drawings for explaining a simulation of a holographic display by using a display optical system model according to an embodiment of the present disclosure.

DETAILED DESCRIPTION OF THE EMBODIMENTS

Figure 1:
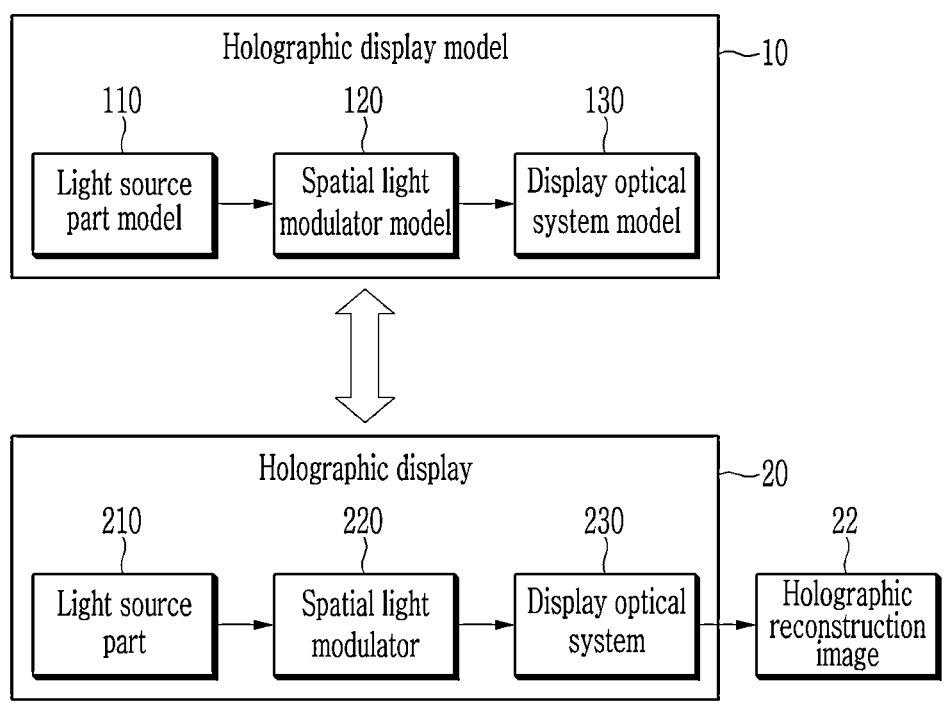
FIG. 1 and FIG. 2 are block diagrams for explaining a holographic display device according to an embodiment of the present disclosure.

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure. Accordingly, the drawings and description are to be regarded as illustrative in nature and not restrictive, and like reference numerals designate like elements throughout the specification.

Throughout the specification and claims, unless explicitly described to the contrary, the word "comprise" and variations such as "comprises" or "comprising" will be understood to imply the inclusion of stated elements but not the exclusion of any other elements. In addition, the terms "-er", "-or", "unit", "portion", "part", and "module" described in the specification mean units for processing at least one function and operation, and can be implemented by hardware components or software components and combinations thereof.

Figure 2:
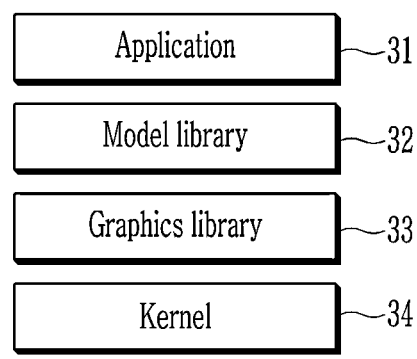

FIG. 1 and FIG. 2 are block diagrams for explaining a holographic display simulation device according to an embodiment of the present disclosure.

Referring to FIG. 1, a holographic display simulation device according to an embodiment of the present disclosure may simulate a holographic display by using a holographic display model 10. Here, the holographic display model 10 may be one of modeling the holographic display 20.

Specifically, the holographic display model 10 may include at least one of a light source part model 110, a spatial light modulator model 120, and a display optical system model 130. The light source part model 110, the spatial light modulator model 120, and the display optical system model 130 may be those that model a light source part 210, a spatial light modulator 220, and a display optical system 230 of the holographic display 20, respectively.

The light source part 210 may emit light used to reconstruct a hologram to an image form. The light source part 210 may include a light source of a red (R) wavelength, a light source of a green (G) wavelength, or a light source of a blue (B) wavelength, and the light source part 210 may be configured of an RGB laser or a light emitting diode (LED), but the scope of the present disclosure is not limited thereto.

The spatial light modulator 220 may diffract light emitted from the light source part 210 to reconstruct a hologram reconstruction image in a form of an image in space. The spatial light modulator 220 may be configured of a liquid crystal (LC), a liquid crystal on silicon (LCoS), a digital micro-mirror device (DMD), and the like, but the scope of the present disclosure is not limited thereto.

The display optical system 230 may transmit the light wave diffracted from the spatial light modulator 220 into a space, and may reconstruct a holographic image 22 in a space desired by a user. To this end, the display optical system 230 may include a plurality of lenses.

Figure 13:
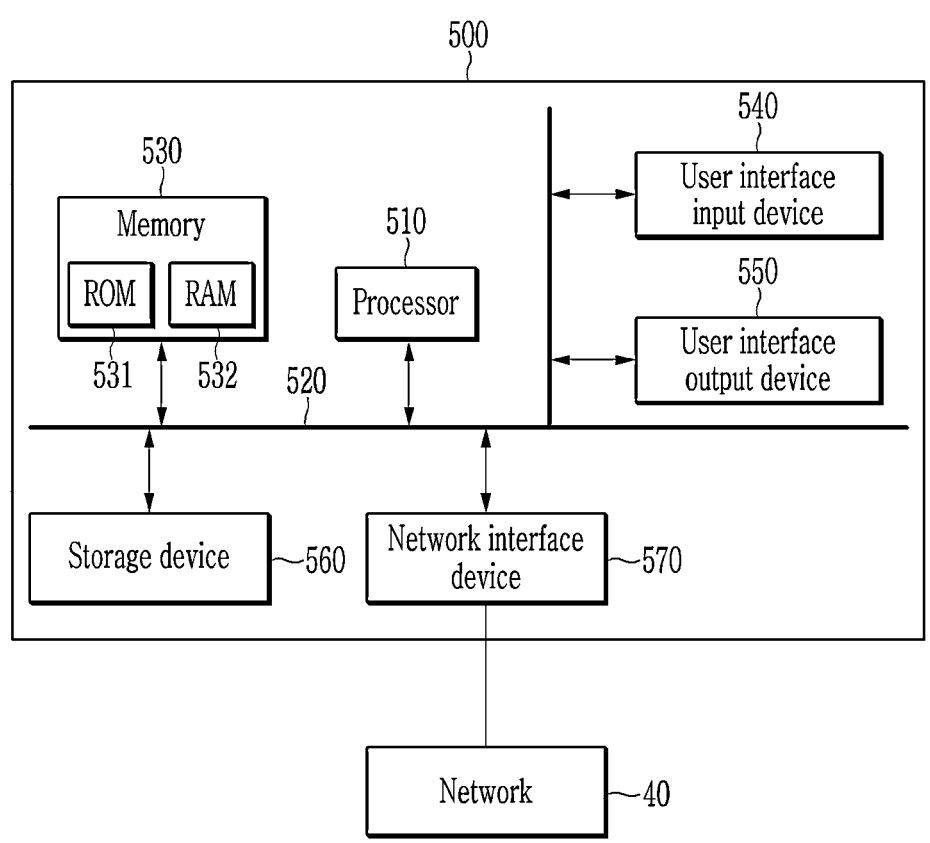
FIG. 13 is a block diagram for explaining a computing device for implementing a holographic display simulation device and a holographic display simulation method according to embodiments of the present disclosure.

The holographic display simulation device according to the embodiment of the present disclosure, as shown in FIG. 13, may include a processor and a memory, and the memory may include one or more instructions executed by the processor.

One or more instructions may be executed by the processor to simulate the holographic display 20 by using at least one of the light source part model 110, the spatial light modulator model 120, and the display optical system model 130.

Meanwhile, the holographic display simulation device according to the embodiment of the present disclosure, as shown in FIG. 13, may further include a storage device, and the storage device may include a model library including at least one of the light source part model 110, the spatial light modulator model 120, and the display optical system model 130. Accordingly, the processor may access the model library from the storage device.

The light source part model 110 may be a model for performing a partial coherence simulation with respect to the light source part 210. The processor may input first format data to the light source part model 110 to obtain a first output wave field as a result of the partial coherence simulation for the light source part 210. Here, the first format data may be represented in an extensible markup language (XML) language defining the light source part model 110, and interoperability may be provided between different holographic displays through a standardized data interface.

The spatial light modulator model 120 may be a model for performing simulation on the spatial light modulator 220. The processor may input second format data to the spatial light modulator 220 to obtain a second output wave field as a result of simulation for the spatial light modulator 220. Here, the second format data may be represented in the XML language defining the spatial light modulator model 120, and interoperability may be provided between different holographic displays through a standardized data interface.

The display optical system model 130 may be a model for performing simulation on the display optical system 230. Particularly, the display optical system model 130 may include a wavefront aberration model 132 and a cascaded propagation model 134.

The wavefront aberration model 132 may be a model for performing simulation on a wavefront aberration of the holographic display 20. The processor may input third format data to the wavefront aberration model 132 to obtain a third output wave field as a result of simulation for the wavefront aberration of the holographic display 20.

Meanwhile, the cascaded propagation model 134 may be a model for performing simulation of cascaded propagation of the holographic display 20. The processor may input fourth format data to the cascaded propagation model 134 to obtain a fourth output wave field as a result of simulation for the cascaded propagation of the holographic display 20.

Here, the third format data and the fourth format data may be expressed in the XML language defining the wavefront aberration model 132 and the cascaded propagation model 134, respectively, and interoperability may be provided between different holographic displays through the standardized data interface.

Referring to FIG. 2, a holographic display device 30 according to an embodiment of the present disclosure may have a hierarchical structure, and the hierarchical structure may include an application layer 31, a model library layer 32, a graphics library layer 33, and a kernel layer 34.

The application layer 31 may be a layer corresponding to an application for performing simulation. The application layer 31 may perform a simulation according to a user's request by using a model library provided in the model library layer 32, and provide the result to the user.

The model library layer 32 may include a model library required for simulation. Specifically, the model library may include the light source part model 110 that respectively models the light source part 210, the spatial light modulator 220, and the display optical system 230 of the holographic display 20; and the spatial light modulator model 120 and the display optical system model 130. The model library layer 32 may provide a model matching a corresponding request among the model library to the application layer 31 according to a request of the application layer 31.

The graphics library layer 33 may include a graphics library that may be used by the application layer 31 or the model library layer 32, and the kernel layer 34 may directly control or use hardware used by the graphics library.

Hereinafter, the light source model 110, the spatial light modulator model 120, the wavefront aberration model 132, and the cascaded propagation model 134 will be described in detail with reference to FIG. 3 to FIG. 12.

Figure 5:
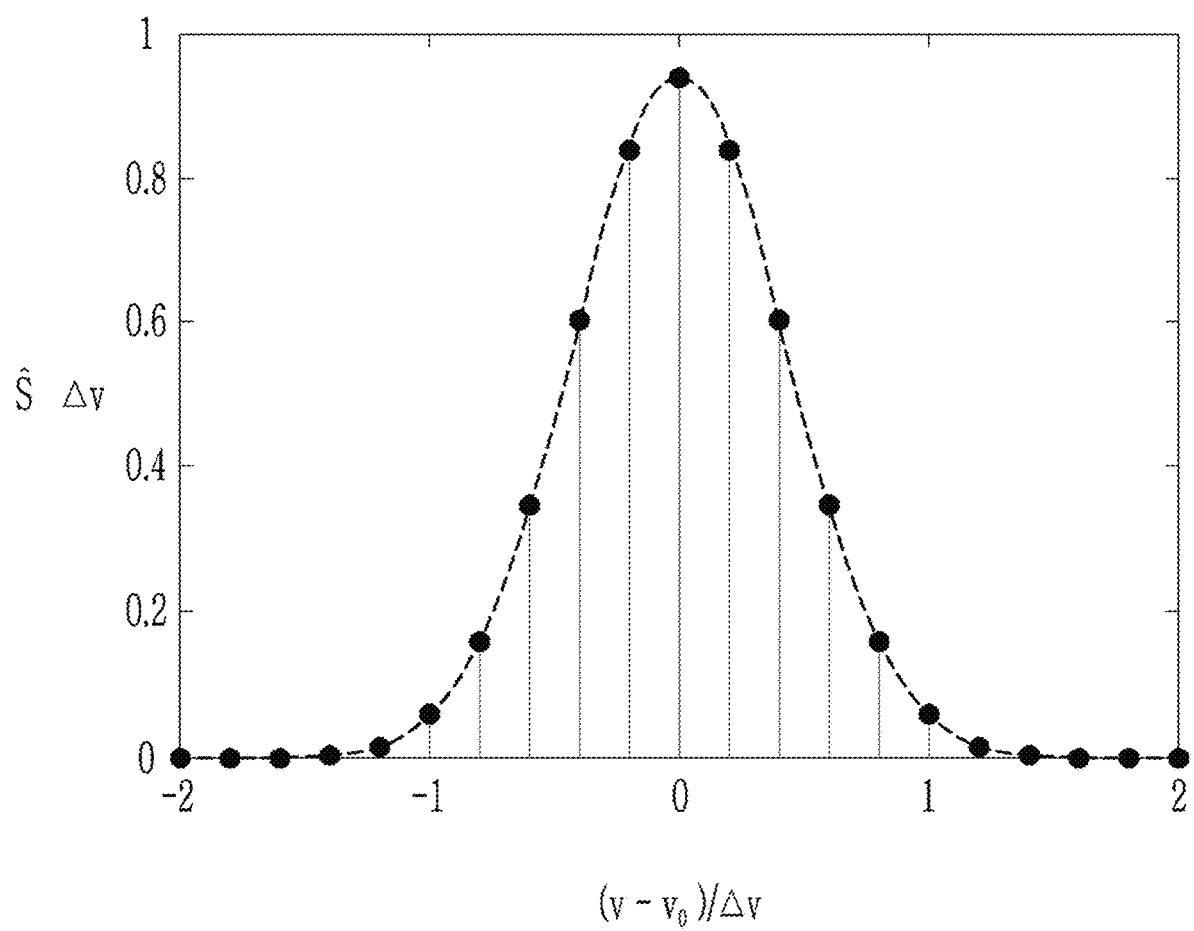

FIG. 3 to FIG. 5 are drawings for explaining a simulation of the holographic display by using the light source part model according to the embodiment of the present disclosure.

Referring to FIG. 3, the light source part model 110 may be used to perform image reconstruction simulation of a digital hologram according to the coherence of a holographic display light source such as a laser or an LED. To this end, first format data D1 may be inputted to the light source part model 110, and information for defining the light source part model 110 may be included in the first format data D1 as an XML schema.

Generally, high coherence may provide a stable interference effect necessary for diffraction and imaging of monochromatic light. For partial coherent simulation of the light source, a coherent characteristic of the input light source may be represented as a full width at half maximum (FWHM) of a power spectral density function of a center wavelength of a light source and a spectral radiance.

Referring to FIG. 4 together therewith, FIG. 4 shows the full width at half maximum (FWHM) centered on the center wavelength in the power spectral density function of the input light source applied to the holographic display. A numerical coherent characteristic of the holographic display light source is a superposition wave field of a plurality of coherent light waves that are uncorrelated, and it may represent a partial coherent wave field.

Referring next to FIG. 5 together therewith, FIG. 5 shows a normalized light power spectral density function with sampled elements. As shown in FIG. 5, the optical characteristic of the partial coherent light source may be simulated by adding all the wave fields to which the coherent light source with slightly different wavelengths is applied, extracted at equal pitches in a FWHM section. Equation 1 below shows an example of a modeling method for calculation of numerical simulation of partial coherence.

$$I(x, y) \approx \sum_{n=1}^{N} \overset{*}{S}(v_n) I(x, y; v_n) \delta v \qquad \text{(Equation 1)}$$

Here, I(x,y) represents a spectral irradiance, $S(v_n)$ represents an optical power spectral density function, and $\delta v$ represents a frequency pitch between sampled wavelength elements.

An optical effect according to a degree of coherence of the holographic display light source may be confirmed from a first output wave field WF1 outputted as a result of the partial coherent simulation of the light source. All the variables and optical parameters defining the partial coherent model of the holographic display, that is, the light source part model 110 as described above, may be provided in a form of a separate interoperable data format of the first format data D1.

The data format defining the light source part model 110 may include, for example, the following elements.

| Name | Definition |
| --- | --- |
| PartialCoherenceType | Hologram as highest level descriptive structure for partial coherence, configured of temporal coherence and spatial coherence descriptive structures |
| ReconstructionDistance | Distance from digital hologram to a position at which reconstruction image of digital hologram is positioned |
| TemporalCoherence | Temporal partial coherence descriptive structure |
| NumberOfComponents | Number of components |
| FWHM | Spectrum width at position that is ½ of peak on spectrum such as frequency response (full width at half maximum: FWHM) |

In the present embodiment, the first format data D1 may be expressed in the XML language, so it is easily machine-read, and especially, it is convenient for data transmission between heterogeneous formats, and is highly scalable. Referring to FIG. 3, in the first format data D1, several elements are described as a syntax definition of XML schema. For example, in the first format data D1, in order to define the light source part model 110, temporal partial coherence type ("TemporalCoherenceType") of information may be included as an XML schema. Meanwhile, although not shown in FIG. 3, in the first format data D1, spatial partial coherence type ("SpatialCoherenceType") of information may be included as an XML schema to define the light source part model 110.

The first output wave field WF1 outputted as a result of the simulation for the light source part model 110 may be provided to the spatial light modulator model 120 to be collected together with a subsequent simulation result or to be used in a subsequent simulation process, and if necessary, the first output wave field WF1 itself may be directly provided to the user.

Figure 6:
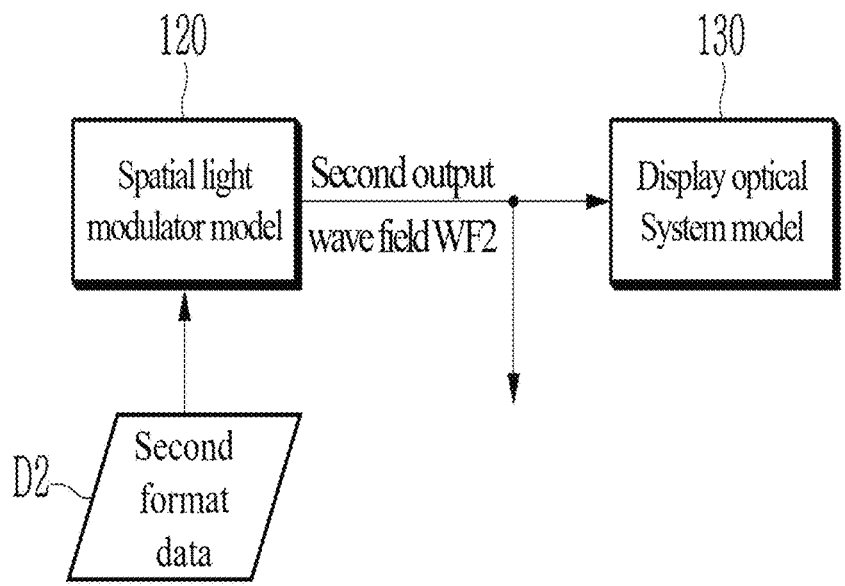
FIG. 6 is a drawing for explaining a simulation of a holographic display by using a spatial light modulator model according to an embodiment of the present disclosure.

FIG. 6 is a drawing for explaining a simulation of a holographic display by using a spatial light modulator model according to an embodiment of the present disclosure.

Referring to FIG. 6, the spatial light modulator model 120 may be used to perform a simulation for the spatial light modulator. To this end, second format data D2 may be inputted to the spatial light modulator model 120, and information for defining the spatial light modulator model 120 may be included in the second format data D2 as an XML schema.

A simulation result may be confirmed from a second output wave field WF2 that is outputted as a result of the simulation for the spatial light modulator. All the variables and parameters defining the spatial light modulator model 120 as described above may be provided in a form of a separate interoperable data format of the second format data D2.

Figure 12:
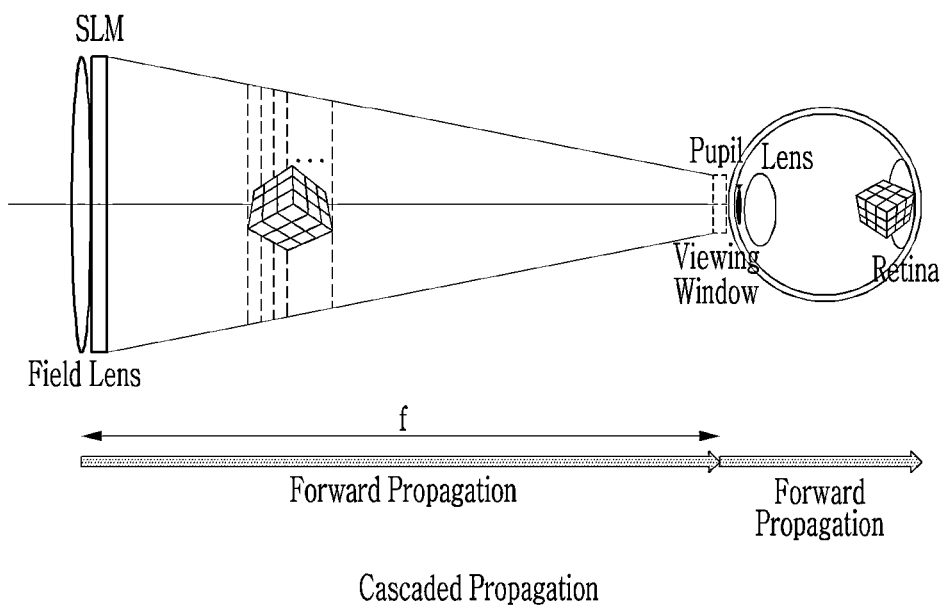

A viewing-window type of holographic display model may improve a narrow file of view (FOV) due to limitation of pixel pitch performance of the spatial light modulator. In this method, light diffracted from each pixel of the spatial light modulator is formed in a small viewing window at an observer's pupil position by using a lens, thereby securing a wide FOV instead of restricting an observer's position. Particularly, a viewing window-based holographic display model applied to a human visual system (HVS) structure, as shown in FIG. 12, may consist of a field lens positioned on a surface of the spatial light modulator, and the pupil, crystalline lens, and retina of the human visual system. A plane wave of a holographic display light source such as a laser or LED is diffracted by a hologram displayed on the spatial light modulator, and the diffracted light is converted into a frequency domain at a plane positioned at a focal length of the field lens, that is, the pupil position. In this case, only a complex wave from which a DC term is removed may be obtained by passing through the pupil of a band-pass filter function, and then the hologram reconstruction image may be reconstructed on the retinal surface through the crystalline lens. A size of the viewing window formed in front of the pupil may be determined by a pixel pitch on the holographic image plane, a distance from the holographic image plane to the viewing window, that is, the pupil, and a wavelength of a light source such as a laser illuminating the spatial light modulator.

The data format defining the spatial light modulator model 120 may include, for example, the following elements.

| Name | Definition |
| --- | --- |
| Hologram | Hologram descriptive structure defining digital hologram data characteristic parameter |
| Wavelength | Wavelength value of light source applied in digital hologram generation process |
| PixelPitchHor | Pixel pitch in horizontal direction defined in digital hologram generation process |
| PixelPitchVer | Pixel pitch in vertical direction defined in digital hologram generation process |
| ReconstructionDistance | Distance from digital hologram to a position at which reconstruction image of digital hologram is positioned |

In the present embodiment, the second format data D2 may be expressed in the XML language, so it is easily machine-read, and especially, it is convenient for data transmission between heterogeneous formats, and is highly scalable. Referring to FIG. 6, in the second format data D2, several elements are described as a syntax definition of the XML schema. For example, in the second format data D2, hologram data type ("HologramType") of information may be included as an XML schema to define the spatial light modulator model 120.

The second output wave field WF2 outputted as a result of the simulation for the spatial light modulator model 120 may be provided to the display optical system model 130 to be collected together with a subsequent simulation result or to be used in a subsequent simulation process, and if necessary, the second output wave field WF2 itself may be directly provided to the user.

FIG. 7 to FIG. 12 are drawings for explaining a simulation of a holographic display by using a display optical system model according to an embodiment of the present disclosure.

Figure 7:
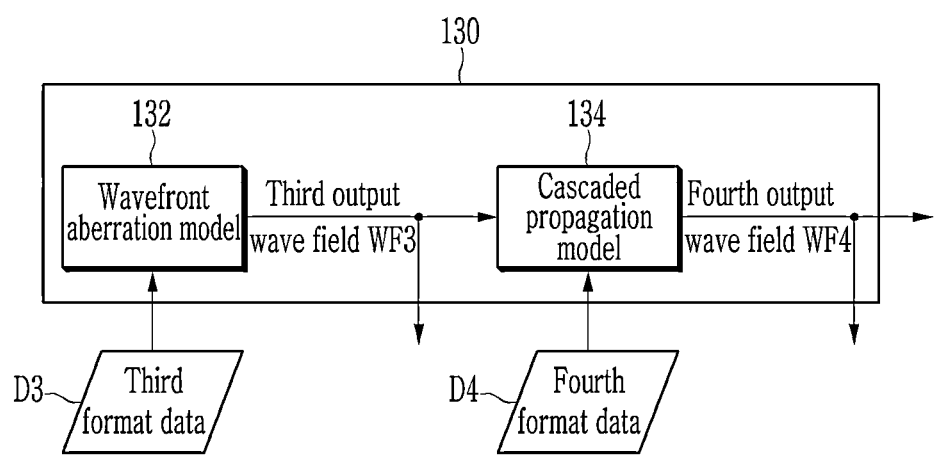

Referring to FIG. 7, the wavefront aberration model 132 may be used to perform a simulation of the wavefront aberration of the holographic display. To this end, third format data D3 may be inputted to the wavefront aberration model 132, and information for defining the wavefront aberration model 132 may be included in the third format data D3 as an XML schema.

The holographic display optical system may be configured of various optical elements such as a lens, a mirror, and a prism. The main elements of the cascaded propagation model of the viewing a window-based holographic display include a spatial light modulator, a field lens, a pupil, a crystalline lens (lens), and a retina. All of these optical elements have various optical aberrations, representative aberrations may include a spherical aberration, a coma aberration, astigmatism, a curvature of field, a distortion aberration, and the like, and these aberrations affect sharpness of an image and reduce a resolution. The wavefront aberration may be defined as a difference between a wavefront generated from an optical structure and a wavefront generated from an actually measured optical structure, and the wavefront aberration may be expressed for each series by using the Zernike polynomial.

The Zernike polynomial is configured of a sum of respective terms whose coefficients represent aberrations, and respective terms have orthogonality with each other.

$$W(\rho, \theta) = \sum_n \sum_m W_n^m Z_n^m(\rho, \theta)$$ (Equation 2)

Figure 10:
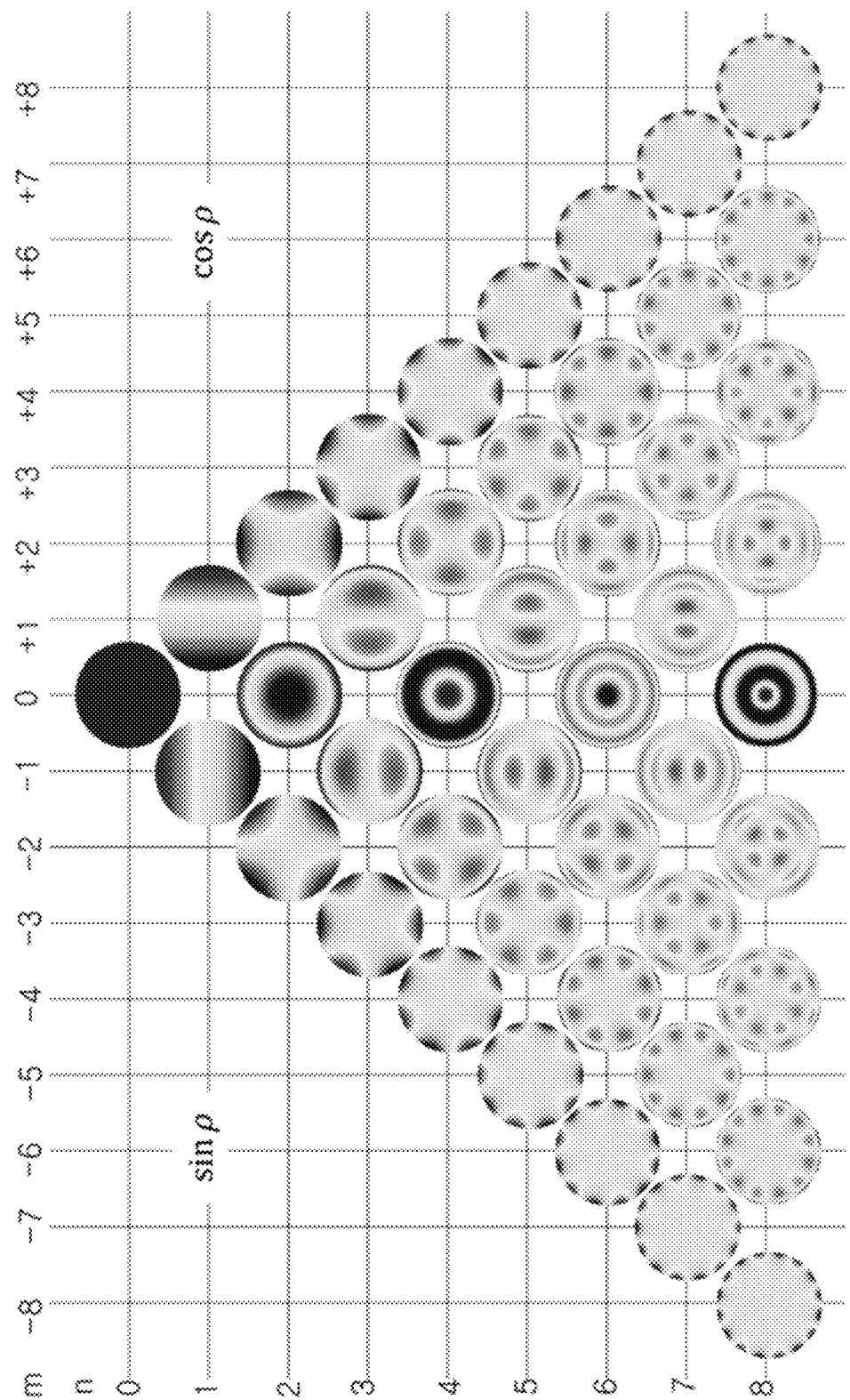

Here, the wavefront aberration $W(\rho,\theta)$ is expressed as a combination of the Zernike polynomials, where $Z_n^m(\rho,\theta)$ is the Zernike polynomial of each degree, and $W_n^m$ represents a corresponding coefficient. Generally, the astigmatism and the coma correspond to components up to the second order of the Zernike function, and FIG. 10 shows a set of Zernike polynomial coefficients having a hierarchical structure up to the eighth order.

As in Equation 2, by using the wavefront aberration $W(\rho,\theta)$ expressed by the combination of the Zernike polynomials, the wave field $P(\rho,\theta)$ reflected as a wavefront phase may be expressed as follows.

$$P(\rho, \theta) = e^{-j\frac{2\pi}{\lambda}W(\rho,\theta)}$$ (Equation 3)

Based on these contents, a characteristic analysis and simulation may be provided in the propagation process of the cascaded wave field in the holographic display optical system by using the wave field information reflecting the wavefront aberration of optical elements such as lenses.

A simulation result may be confirmed from a third output wave field WF3 that is outputted as a result of the simulation for the wavefront aberration of the holographic display. All the variables and parameters defining the wavefront aberration model 132 as described above may be provided in a form of a separate interoperable data format of the third format data D3.

The data format defining the wavefront aberration model 132 may include, for example, the following elements.

| Name | Definition |
| --- | --- |
| WavefrontAberrationType | Highest level descriptive structure for wavefront aberration |
| Wavelength | Wavelength value of wave field |
| PixelPitchHor | Pixel pitch in horizontal direction of wave field wavefront |
| PixelPitchVer | Pixel pitch in vertical direction of wave field wavefront |
| ResolutionHor | Horizontal resolution of wave field wavefront |
| ResolutionVer | Vertical resolution of wave field wavefront |
| ZernikeCoeff | Coefficient value of Zernike polynomial; z00-z44 (45 total) |

In the present embodiment, the third format data D3 may be expressed in the XML language, so it is easily machine-read, and especially, it is convenient for data transmission between heterogeneous formats, and is highly scalable. Referring to FIG. 8 and FIG. 9, in the third format data D3, several elements are described as a syntax definition of XML schema. For example, in the third format data D3, wavefront aberration type ("WavefrontAberrationType") of information may be included as an XML schema to define the wavefront aberration model 132.

The third output wave field WF3 outputted as a result of the wavefront aberration model 132 may be provided to the cascaded propagation model 134 to be collected together with a subsequent simulation result or to be used in a subsequent simulation process, and if necessary, the third output wave field WF3 itself may be directly provided to the user.

The cascaded propagation model 134 may be used for performing a simulation of cascaded propagation of the holographic display. To this end, fourth format data D4 may be inputted to the cascaded propagation model 134, and information for defining the cascaded propagation model 134 may be included in the fourth format data D4 as an XML schema.

A simulation result may be confirmed from a fourth output wave field WF4 that is outputted as a result of the simulation for the cascaded propagation of the holographic display. All the variables and parameters defining the cascaded propagation model 134 as described above may be provided in a form of a separate interoperable data format of the fourth format data D4.

The data format defining the cascaded propagation model 134 may include, for example, the following elements.

| Name | Definition |
| --- | --- |
| CascadedPropagationType | Highest level descriptive structure for cascaded propagation |
| NumColors | Number of color channels |
| WavelengthR | Wavelength value of red light source applied in digital hologram reconstruction process |
| WavelengthG | Wavelength value of green light source applied in digital hologram reconstruction process |
| WavelengthB | Wavelength value of blue light source applied in digital hologram reconstruction process |
| PixelPitchHor | Pixel pitch in horizontal direction defined in digital hologram generation process |
| PixelPitchVer | Pixel pitch in vertical direction defined in digital hologram generation process |
| ResolutionHor | Horizontal resolution of digital hologram |
| ResolutionVer | Vertical resolution of digital hologram |
| FieldLensFocalLength | Focal length of field lens |
| DistReconstructionPlaneToPupil | Distance from reconstruction plane to pupil |
| DistPupilToRetina | Distance from pupil to retina |
| PupilDiameter | Pupil diameter |
| HologramPath | File path where digital hologram is positioned |

In the present embodiment, the fourth format data D4 may be expressed in the XML language, so it is easily machine-read, and especially, it is convenient for data transmission between heterogeneous formats, and is highly scalable. Referring to FIG. 11, in the fourth format data D4, several elements are described as a syntax definition of the XML schema. For example, in the fourth format data D4, cascaded propagation type ("CascadedPropagationType") of information may be included as an XML schema to define the cascaded propagation model 134.

The fourth output wave field WF4 outputted as a result of the simulation of the cascaded propagation model 134 may be provided to the user as a final simulation result for the holographic display model.

FIG. 13 is a block diagram for explaining a computing device for implementing a holographic display simulation device and a holographic display simulation method according to embodiments of the present disclosure.

Referring to FIG. 13, the holographic display simulation device and the holographic display simulation method according to the embodiment of the present disclosure may be implemented by using a computing device 500.

The computing device 500 may include at least one of a processor 510, a memory 530, a user interface input device 540, a user interface output device 550, and a storage device 560 in communication through a bus 520. The computing device 500 may also include a network interface 570 electrically connected to a network 40, for example, a wireless network. The network interface 570 may transmit or receive signals with other entities through the network 40.

The processor 510 may be implemented in various types such as an application processor (AP), a central processing unit (CPU), and a graphics processing unit (GPU), and may be a semiconductor device that executes instructions stored in the memory 530 or the storage device 560. The processor 510 may be configured to implement the functions and methods described with reference to FIG. 1 to FIG. 12.

The memory 530 and the storage device 560 may include various types of volatile or non-volatile storage media. For example, the memory may include a read-only memory (ROM) 531 and a random access memory (RAM) 532. In the embodiment of the present disclosure, the memory 530 may be positioned inside or outside the processor 510, and the memory 530 may be connected to the processor 510 through various known means.

In addition, at least some of the holographic display simulation device and the holographic display simulation method according to the embodiments of the present disclosure may be implemented as a program or software executed in the computing device 500, and the program or software may be stored in a computer-readable medium.

In addition, at least some of the holographic display simulation device and the holographic display simulation method according to the embodiments of the present disclosure may be implemented by hardware capable of being electrically connected to the computing device 500.

According to the embodiments of the present disclosure described so far, they are provided as a separate data format through a standardized data interface that provides variables and parameters defining a least one of a light source part model respectively modeling a light source part, a spatial light modulator, and a display optical system of a holographic display; a spatial light modulator model; and a display optical system model, so that it is possible to provide interoperability for holographic displays having various structures or implemented in various ways.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A holographic display simulation device, comprising:
   a processor; and
   a memory including one or more instructions,
   wherein the one or more instructions are executed by the processor, and
   a holographic display is simulated by using one or more of a light source part model, a spatial light modulator model, and a display optical system model, the light source part model, the spatial light modulator model, and the display optical system model respectively corresponding to a light source part, a spatial light modulator, and a display optical system of the holographic display,
   wherein, when the holographic display is simulated by using the light source part model, the processor inputs first format data to the light source part model to obtain a first output wave field as a result of partial coherence simulation for the light source part, and
   wherein, in the first format data, temporal partial coherence type information is included as an XML schema to define the light source part model.

2. The holographic display simulation device of claim 1, wherein
   in the first format data,
   spatial partial coherence type information is included as an XML schema to define the light source part model.

3. The holographic display simulation device of claim 1, wherein, when the holographic display is simulated by further using the spatial light modulator model,
   the first output wave field is provided to the spatial light modulator model.

4. The holographic display simulation device of claim 1, further comprising
   a storage device storing a model library including the one or more of the light source part model, the spatial light modulator model, and the display optical system model.

5. A holographic display simulation device, comprising:
   a processor; and
   a memory including one or more instructions,
   wherein the one or more instructions are executed by the processor, and
   a holographic display is simulated by using one or more of a light source part model, a spatial light modulator model, and a display optical system model, the light source part model, the spatial light modulator model, and the display optical system model respectively corresponding to a light source part, a spatial light modulator, and a display optical system of the holographic display,
   wherein, when the holographic display is simulated by using the spatial light modulator model,
   the processor inputs second format data to the spatial light modulator model to obtain a second output wave field as a result of simulation for the spatial light modulator,
   wherein, in the second format data, holographic data type information is included as an XML schema to define the spatial light modulator model.

6. The holographic display simulation device of claim 5, wherein, when the holographic display is simulated by further using the display optical system model,
   the second output wave field is provided to the display optical system model.

7. The holographic display simulation device of claim 5, wherein
   the display optical system model includes a wavefront aberration model and a cascaded propagation model, and
   when the holographic display is simulated by further using the display optical system model, the processor inputs third format data to the wavefront aberration model to obtain a third output wave field as a result of simulation for a wavefront aberration of the holographic display.

8. The holographic display simulation device of claim 7, wherein
   in the third format data,
   wavefront aberration type information is included as an XML schema to define the wavefront aberration model.

9. The holographic display simulation device of claim 7, wherein
   the third output wave field is provided to the cascaded propagation model.

10. The holographic display simulation device of claim 7, wherein
    the processor inputs fourth format data to the cascaded propagation model to obtain a fourth output wave field as a result of simulation for cascaded propagation of the holographic display.

11. The holographic display simulation device of claim 10, wherein
    in the fourth format data,
    cascaded propagation type information is included as an XML schema to define the cascaded propagation model.

12. A holographic display simulation method, comprising:
being provided with one or more of a light source part model, a spatial light modulator model, and a display optical system model, the light source part model, the spatial light modulator model, and the display optical system model respectively corresponding to a light source part, a spatial light modulator, and a display optical system of a holographic display;
simulating the holographic display by using the one or more of the light source part model, the spatial light modulator model, and the display optical system model; and
obtaining a wave field as a result of the simulating,
wherein, when the simulating uses the light source part model, the simulating includes inputting first format data to the light source part model and performing a partial coherence simulation for the light source part,
wherein, in the first format data, temporal partial coherence type information is included as an XML schema to define the light source part model.

13. The holographic display simulation method of claim 12, wherein, when the simulating uses the spatial light modulator model,
the simulating includes inputting second format data to the spatial light modulator model and performing a simulation for the spatial light modulator.

14. The holographic display simulation method of claim 12, wherein
the display optical system model includes a wavefront aberration model and a cascaded propagation model, and
when the simulating uses the display optical system model, the simulating includes inputting third format data to the wavefront aberration model and performing a simulation for a wavefront aberration of the holographic display.

15. The holographic display simulation method of claim 14, wherein
the simulating includes inputting fourth format data to the cascaded propagation model and performing a simulation for cascaded propagation of the holographic display.

16. The holographic display simulation method of claim 12, further comprising
accessing a model library including the one or more of the light source part model, the spatial light modulator model, and the display optical system model from a storage device.

* * * * *